(12) United States Patent
Maciel De Faria et al.

(10) Patent No.: US 8,238,433 B2
(45) Date of Patent: Aug. 7, 2012

(54) METHOD TO TRANSCODE H.264/AVC VIDEO FRAMES INTO MPEG-2 AND DEVICE

(75) Inventors: Sérgio Manuel Maciel De Faria, Leiria (PT); Pedro António Amado De Assunção, Arrabal (PT); Sandro Rodrigo Ferreira Moiron, Leiria (PT); Vitor Manuel Mendes Da Silva, Coimbra (PT); António Navarro Rodrigues, Coimbra (PT)

(73) Assignee: Instituto Politécnico De Leiria, Leiria (PT)

( * ) Notice: Subject to any disclaimer, the term of this patent is extended or adjusted under 35 U.S.C. 154(b) by 413 days.

(21) Appl. No.: 12/474,915

(22) Filed: May 29, 2009

(65) Prior Publication Data

US 2009/0323813 A1 Dec. 31, 2009

(30) Foreign Application Priority Data

Jun. 2, 2008 (PT) .......................................... 104083

(51) Int. Cl.
*H04N 7/28* (2006.01)

(52) U.S. Cl. .......... 375/240.17; 375/240.16; 375/240.15
(58) Field of Classification Search ............. 375/240.16, 375/240.17
See application file for complete search history.

(56) References Cited

U.S. PATENT DOCUMENTS

| 7,720,148 B2* | 5/2010 | Au et al. .................. 375/240.12 |
| 2004/0057521 A1* | 3/2004 | Brown et al. ............ 375/240.25 |
| 2007/0030903 A1* | 2/2007 | Cote et al. ............... 375/240.16 |
| 2007/0286286 A1* | 12/2007 | Heng et al. ............... 375/240.16 |

* cited by examiner

*Primary Examiner* — Sath V Perungavoor
*Assistant Examiner* — Jeffery Williams
(74) *Attorney, Agent, or Firm* — Kenealy Vaidya LLP

(57) ABSTRACT

A method and device to transcode H.264/AVC video frames into MPEG-2 can include converting the H.264/AVC interframe coding modes into modes allowed by MPEG-2 and converting H.264/AVC motion information into corresponding MPEG-2 semantics, and determining a most suitable motion vector for each MPEG-2 macro-block, on the basis of motion vectors of reference frames and sub-blocks of a H.264/AVC macro-block corresponding to the MPEG-2 macro-block.

14 Claims, 3 Drawing Sheets

METHOD TO TRANSCODE H.264/AVC VIDEO FRAMES INTO MPEG-2 AND DEVICE

This application claims the priority benefit under 35 U.S.C. §119 of Portugal Patent Application No. 104083 filed on Jun. 2, 2008, which is hereby incorporated in its entirety by reference.

BACKGROUND

1. Field

The disclosed subject matter pertains to the conversion (4) between compressed digital video formats, consisting of or comprising a process of transcoding between the formats defined by the H.264/AVC (1) and MPEG-2 (8) norms.

This process of transcoding consists of or includes methods that convert the syntax and the semantics of the binary data flows into an H.264/AVC (1) format in their corresponding elements of the MPEG-2 (8) format, using less complex techniques which offer a high compression efficiency.

Thus, this disclosed subject matter is useful to be implemented in the software or hardware of transcoders using, for example, platforms in which hardware is shared by various processes, and can be applied in interlinking hubs of heterogeneous communication networks, i.e. using different technologies, video servers with a capacity to adapt the compressed format, connection modules between video distribution networks and domestic equipment and networks (domestic servers and multiformat video players/recorders), used in the area of multimedia services and applications.

2. Technical Area

The disclosed subject matter is part of the technological area of video transcoding (23), more precisely the field of processing compressed video signals. In the context of this disclosed subject matter, video transcoding (23) consists of or includes converting video content between different coding patterns.

An efficient method is made available for transcoding (23) video frames originally coded in the H.264/AVC (1) format into the MPEG-2 (8) format, using temporal prediction. The transcoding method (23) consists of or includes, in turn, of methods of converting (i) interframe coding modes (4) and (ii) movement information integrated into the video coded in H.264/AVC (1) for the MPEG-2 (8) format. The methods (i) process the information on the coding mode associated with each temporally predicted H.264/AVC (1) macro-block, and produce the new information of the corresponding coding mode, in the MPEG-2 (8) semantic; and the methods (ii) process the information of the motion associated with the multiple references frames, and produce the corresponding motion information in the MPEG-2 (8) semantic.

The proposed algorithms provide an efficient method of mode conversion (4), which can be used, for example, in domestic servers (22) with an additional layer or module, as well as in systems to record personal videos. The use of these schemes enables H.264/AVC (1) video content to be received, which can be circulated at home in MPEG-2 (8), through wired connections (27), or wireless connections (26), with any other device that includes a common MPEG-2 decoder.

SUMMARY

The disclosed subject matter concerns a transcoding method (23), which significantly reduces the computational complexity of an H.264/AVC (1) to MPEG-2 (8) transcoder (23), extracting and processing the coding of interframe information contained in the flux of H.264/AVC (1) bits in a suitable manner. The objective quality of the signal which is achieved by such a transcoder (23), using the Peak Signal to Noise Ratio as a quality metric, is identical to that of a total recoding, but with a far quicker processing time. The experimental results of an implementation based on software demonstrate that up to 60% savings can be achieved in terms of computational complexity.

The transcoder (23) shown in FIG. 1 consists of a H.264/AVC (2) decoder, an interframe data conversion module (4) and an MPEG-2 (6) coder. The H.264/AVC (2) decoder and the MPEG-2 (6) coder possess, respectively, signal outputs (3) and inputs (5) and coding parameters that constitute the input and output of the conversion module (4), as will be described shortly. The presently disclosed subject matter essentially comprises conversion methods included in the interframe data conversion module (4).

BACKGROUND

The following four documents represent the closest technical state to the presently disclosed subject matter.

Document WO2004093461 divulges a video transcoder that receives a coded signal in an initial video signal coding format, decodes this signal so as to generate a decoded signal, extracts a set of estimated motion data on the basis of the initial video signal (still according to the initial format), and generates a second set of estimated motion data based on the first set of estimated motion data. This second set of estimated motion data is coded in a second coding format. It does not undermine the novelty of the disclosed subject matter in question, because unlike the presently disclosed subject matter, where the determination of the best motion vector candidate is based only on the criterion of minimum residue, irrespective of the size of the block, in the aforesaid document the motion vectors are determined using the average of the set of candidate vectors and the selection of the best motion vector candidate is based on the size of the block. A method according to the presently disclosed subject matter can be more effective in selecting the best vector because it results in a residue signal with less energy. Likewise in this presently disclosed subject matter, the determination of the best position with accuracy of half a pixel is carried out through a search in a window which is 1×1 pixels in size, while in the aforesaid document this is obtained by simply shifting to the closest whole position, or half pixel. The search in a 1×1 window, as is the case in the presently disclosed subject matter, allows better motion vectors to be obtained, which result in residual signals with less energy. Furthermore, the aforesaid document does not construct an exhaustive list of all the possible candidates which result from all the reference frames and all the sub-blocks of the macro-block situated in the same spatial position in the H.264/AVC frames, so as to determine the motion vectors (MV) of a macro-block in MPEG-2 format. The use of this list increases the probability of selecting a better motion vector candidate, than in the case of the aforesaid document. The cited document also does not define a way of converting vectors of the "unrestricted motion vectors" type, while the disclosed subject matter in question presents a method based on inversion and temporal mirroring. Likewise the aforesaid document does not present any method to create bi-directional references based on a single motion vector, unlike the present disclosed subject matter, which defines a method based on a combination of the temporal mirroring technique and the application of a scale and refinement factor.

Document US20070030903 divulges a method to transcode an H.264/AVC format to MPEG-2, consisting of or including the following steps: (A) decoding of the H.264/AVC format to generate a frame with macro-block pairs which used a H.264/AVC coding; (B) determining an indicator mode for each pair of macro-blocks; (C) coding the pairs of macro-blocks in a video output in the MPEG-2 format, using either (i) an MPEG-2 field mode coding, or (ii) an MPEG-2 frame mode coding (frame). It has similarities with the presently disclosed subject matter, because both the method divulged in document US20070030903 as well as the method of the presently disclosed subject matter—according to the information provided—consist of or include decoding an H.264/AVC format video input into a set of macro-blocks, using them to produce new coding information, and coding them in the MPEG-2 format. However, it does not undermine the novelty of the present method, which is different because, as described above, it includes determining motion vectors (MV) in an MPEG-2 format, based on other motion vectors in the H.264/AVC format, by creating a list of candidate MVs constituted by all the MVs extracted from the original macro-block in an H.264/AVC format, redimensioning only the candidate MVs that use reference frames that are different from the ones permitted by the MPEG-2. The aforesaid document also does not define a way of converting vectors of the "unrestricted motion vectors" type, while this disclosed subject matter presents a method based on inversion and temporal mirroring. Likewise, the aforesaid document also does not present any method to create bi-directional references based on a single motion vector, unlike this disclosed subject matter, which defines a method based on a combination of the temporal mirroring technique and the application of a scale and refinement factor. Unlike the presently disclosed subject matter, where the best motion vector candidate is determined only on the basis of the criterion of minimum residue, irrespective of the size of the block, in the aforesaid document the motion vectors are determined by using the mean, median or mode of the set of candidate vectors and the selection of the best motion vector candidate can be based on the size of the block. The method of the presently disclosed subject matter is more effective in selecting the best vector because it results in a residual signal with less energy.

Document US20070030905 divulges a video transcoder consisting of or including a first processor, and a second digital video signal processor coupled with the first processor. The second processor has (i) a first module configured to realize an initial operation of decoding an input video sequence in a first format, and (ii) a second module configured to realize a second operation of coding of an output video sequence in a second format, wherein the first and second operations take place in a parallel manner. These operations include reconstructions of each macro-block by means of the motion vectors and motion compensation. It does not undermine the novelty of the presently disclosed subject matter because this disclosed subject matter differs by including, as described above, the determination of motion vectors (MV) in an MPEG-2 format, based on other motion vectors in H.264/AVC format, by creating a list of MV candidates constituted by all the MVs extracted from the original macro-block, in an H.264/AVC format, redimensioning only the MV candidates that use different reference frames from the ones permitted by MPEG-2. The aforesaid document also does not define a way of converting vectors of the "unrestricted motion vectors" type, while this disclosed subject matter presents a method based on inversion and temporal mirroring. Likewise, the aforesaid document also does not present any method to create bi-directional references based on a single motion vector, unlike this disclosed subject matter, which defines a method based on a combination of the temporal mirroring technique and the application of a scale and refinement factor. Unlike the presently disclosed subject matter, where the best motion vector candidate is determined only on the basis of the criterion of minimum residue, irrespective of the size of the block, in the aforesaid document the motion vectors are determined by using the mean, median or mode of the set of candidate vectors and the selection of the best motion vector candidate can be based on the size of the block. A method according to the presently disclosed subject matter is more effective in selecting the best vector because it results in a residual signal with less energy.

Document WO2007124491 divulges a method of removing a motion vector from a group of motion vectors used in a coding process; preparing a list of motion vectors; selecting an initial motion vector from the list of motion vectors; supplying an intermediate motion vector using a process of refining the motion vector, a process that partially uses the initial motion vector; forming a region defined by one or more parameters associated with the initial motion vector and one or more parameters associated with the intermediate motion vector; selecting an additional motion vector from the list of motion vectors; determining whether the additional motion vector points to the region; and modifying a state of the additional motion vector. It does not undermine the novelty of the present disclosed subject matter because the method contained in the said document is only aimed at transcoding motion vectors, while the present disclosed subject matter transcodes both the motion information as well as the interframe coding modes, and because the method of the present disclosed subject matter specifically transcodes between the H.264/AVC and MPEG-2 formats, determining the motion vectors (MV) in an MPEG-2 format, on the basis of other motion vectors in the H.264/AVC format, by creating a list of candidate MVs constituted by all the MVs extracted from the original macro-block, in the H.264/AVC format, redimensioning only the candidate MVs that use different reference frames from the ones permitted by the MPEG-2 format. The aforesaid document also does not define a way of converting vectors of the "unrestricted motion vectors" type, while this disclosed subject matter presents a method based on inversion and temporal mirroring. Likewise, the aforesaid document also does not present any method to create bi-directional references based on a single motion vector, unlike this disclosed subject matter, which defines a method based on a combination of the temporal mirroring technique and the application of a scale and refinement factor.

The presently disclosed subject matter represents inventive activities as compared to the material divulged in the documents WO2004093461, US20070030903, US20070030905 and WO2007124491, because, unlike document WO2007124491, this is a method that can be applied both to motion vectors as well as to interframe coding modes, and also because, unlike documents WO2004093461, US20070030903, US20070030905 and WO2007124491, it includes the determination of motion vectors (MV) in an MPEG-2 format, based on other motion vectors in the H.264/AVC format, by creating a list of candidate MVs comprising all the MVs extracted from the original macro-block in the H.264/AVC format, redimensioning only the MV candidates that use reference frames that are different from those permitted by the MPEG-2 format.

The said documents do not precisely specify the method used to determine motion vectors (MV) in the MPEG-2 format on the basis of other motion vectors in the H.264/AVC format. They only mention some possibilities for converting H.264/AVC format motion vectors to MPEG-2, but do not include the following aspects, which, in their turn, are an integral part of the proposed method.

Main Differences with Regard to the State of the Technique

A. The creation of a list of candidate motion vectors (MV), constituted by all the MVs extracted from the original macro-block in the H.264/AVC format (1).

B. The procedure described in A only includes the redimensioning of the candidate MVs that use reference frames that are different from those permitted by the MPEG-2 (8) format.

C. Procedure A includes an inverted mirroring method, for MVs that exceed the frame limits ("unrestricted MVs") in bi-directional frames. It consists of or includes inverting the MVs with regard to both the horizontal and vertical axes, along with exchanging the reference frame for the temporally opposite frame, with regard to the frame to be coded.

D. In bidirectional frames, the MVs with a unidirectional prediction are used to generate bidirectional candidate MVs, combining the MV of the unidirectional prediction with an MV inverted in accordance with the procedure described in C.

E. The selection of the best candidate MV, based on the list created in A, B, C and D, using a criterion of least residue, for example, Sum of Square Differences $(SSD=\Sigma_i\Sigma_j\,(f(i,j)-p(i,j))^2)$, or Sum of Absolute Differences $(SAD=\Sigma_i\Sigma_j\,|f(i,j)-p(i,j)|)$, or another criterion.

F. The selected MV is later refined using the same criterion of least residue, in a search window centred on the position described by the selected candidate MV.

Exemplary Advantages

This method can have the advantage of producing better results in terms of image quality, owing to the fact that the selection is based on the criterion of least residue (instead of averages or medians of all the MVs). It presents a more efficient solution than the trivial solution (for example, truncation) in the case of the MVs that exceed the frame edges ("unrestricted MVs") in B type (bi-predictive) frames. It presents a method to improve the prediction of macro-blocks represented by a unidirectional MV in B type (bi-predictive) frames, enabling its bi-directional prediction.

General Description of the Disclosed Subject Matter

This is an efficient method to transcode (23) H.264/AVC (1) format frames into the MPEG-2 (8) format. The method of transcoding (23) comprises methods of converting both (i) interframe modes of coding (4), as well as (ii) motion information inserted into a coded video, from the H.264/AVC (1) format to the MPEG-2 (8) format. The methods (a) process the coding mode information associated with each temporally predicted H.264/AVC (1) macro-block, and produce new coding mode information, equipped with MPEG-2 (8) semantics; and the methods (b) process the motion information associated with the multiple reference frames, and produce motion information, equipped with MPEG-2 (8) semantics.

The method is also characterized by determining motion vectors (MV) in the MPEG-2 (8) format based on other H.264/AVC (1) format motion vectors, by creating a list of candidate MVs, constituted by all the MVs extracted from the H.264/AVC (1) format macro-block, redimensioning only the candidate MVs that use reference frames that are different from those permitted by the MPEG-2 (8). This procedure also includes an inverted mirroring method for the MVs that exceed the edges of the frame ("unrestricted MVs") in bi-directional frames, which consists of or includes the inversion of the MVs with regard to both the horizontal and vertical axes, along with exchanging the reference frame for the temporally opposite frame with regard to the frame being coded. The proposed algorithms provide an efficient conversion method, which can be used in personal video recording systems (25), to receive personal video contents and transmit in the MPEG-2 (8) format, through wire connections (27), or wireless connections (26), to a common MPEG-2 decoder.

This method has the advantage of producing better results in terms of the quality of the frame, owing to the fact that the selection is based on the criterion of least residue (instead of on averages or medians of all the MVs). It also presents a more efficient solution than the trivial solution (for example, truncation), in the case of the MVs that exceed the edges of the frame ("unrestricted MVs") in B type (bi-predictive) frames, and also presents a method to improve the prediction of macro-blocks represented by a unidirectional MV in B type (bi-predictive) frames, enabling its bi-directional prediction.

The current H.264/AVC standard presents a much better compression performance than competing standards, namely MPEG-2. However, the MPEG-2 video standard is still the most common video compression format, and its widespread use in professional and home equipment is expected to last for many years to come, namely in digital television (DTV), personal video recorders (PVR) and digital versatile discs (DVD).

Owing to its higher compression efficiency, the H.264/AVC is becoming increasingly accepted in multimedia applications and services, such as in High Definition Digital Television (HDTV), mobile television (MTV) and the Internet.

The simultaneous use of diverse coding standards undoubtedly raises problems of inter-operationability, because the same type of source material can be available in a format that is incompatible with the target equipment. Moreover: it is very unlikely that the migration of the H.264/AVC technology to MPEG-2, both in terms of professional as well as home equipment will happen in such a short span of time that the problems resulting from the co-existence of both the standards can be ignored. Consequently, transcoding (23) from H.264/AVC (1) to the MPEG-2 (8) format is necessary to maintain retro-compatibility and to facilitate the migration technology.

To date, much of the research and development effort has been focused on constructing efficient transcoding (23) systems from MPEG-2 (8) to H.264/AVC (1), so as to migrate inherited video content to the new format. In contrast, little attention has been paid to the problem of retro-compatibility.

A trivial implementation of a transcoder (23) is a cascade of an H.264/AVC decoder and an MPEG-2 coder. However, such a method completely ignores the H.264/AVC coding information integrated into the flux of bits (1), which is the result of optimization decisions between the rate of bit transfer and distortion, with a view to coding each block with the highest possible efficiency. Using such a trivial transcoder (23), the decoded H.264/AVC (1) frames have to be fully coded in MPEG-2 (8), as though no previous coding information existed. This enormously increases the complexity of the transcoder (23) and the necessary computational resources, without achieving a better coding efficiency.

represents a coder that is compatible with the MPEG-2 (8) norm, modified so as to be able to use output coding parameters (5) supplied by the module (4), and can also optimize values so as to maximize the coding efficiency.

Figure 1:
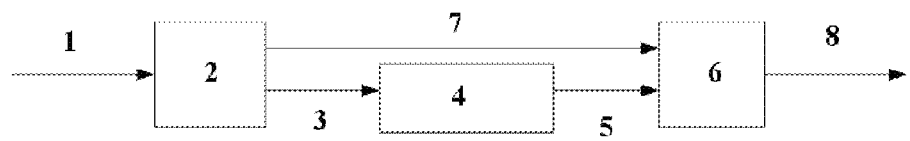
FIG. 1: schematic representation of a transcoder (23) from H.264/AVC (1) video to MPEG-2 (8), which (2) represents a decoder that is compatible with the H.264/AVC norm, modified so as to export the coding parameters included in the input flows (3), and which (4) represents the module which includes part of the present disclosed subject matter, and (6)
Figure 2:
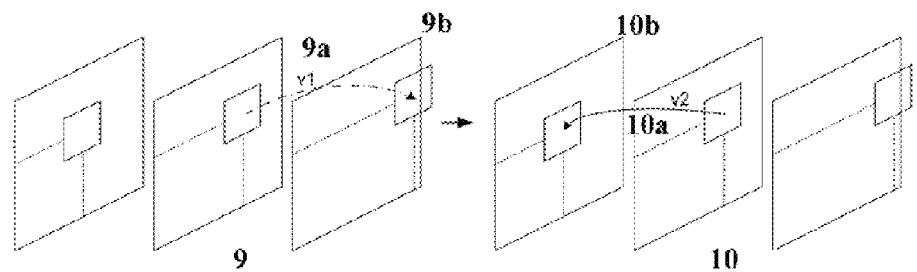

FIG. 2: schematic representation of the method of inverting motion vectors, in which, in scenario A (9), an unrestricted (9a) v1 vector and the respective reference frame (9b) are represented, and, in scenario B (10), the v2 vector resulting from the conversion by applying the inversion method (10a) is represented, along with the new reference frame (10b). In this case, the scale factor used in the motion vector is 1.

Figure 3:
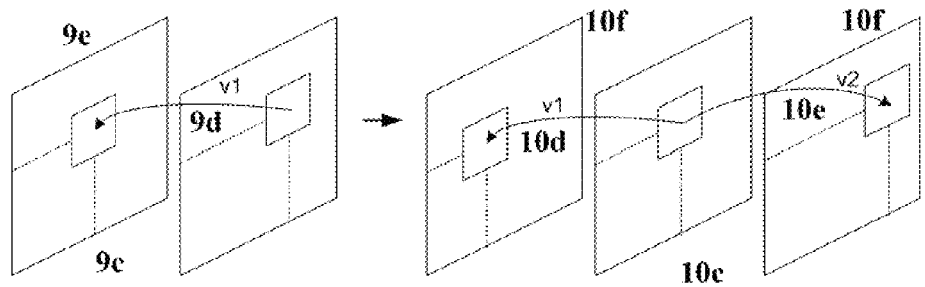

FIG. 3: schematic representation of the conversion method of uni-directional predictions from scenario A (9c) with a reference frame (9e), to bi-directionals in scenario B (10c), by the inversion of the v1 motion vector (9d) maintaining the original v1 (10d) resulting in the inverted v2 vector (10e). Thus, two reference frames (10f) result in scenario B (10c).

Figure 4:
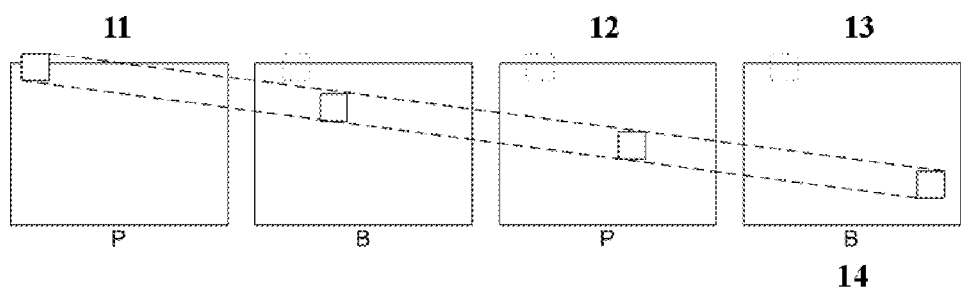

FIG. 4: schematic representation of the method of redimensioning the motion vectors. It consists of or can include multiplying the original vector by a factor, defined by means of equation 3, by the temporal distance between the reference frames. In FIG. 4, (11) is H.264$_{ref\text{-}fn}$, (12) is MPEG-2$_{ref\text{-}fn}$, (13) is $C_{fn}$ and (14) is the Frame Coding Type for each frame.

Figure 5:
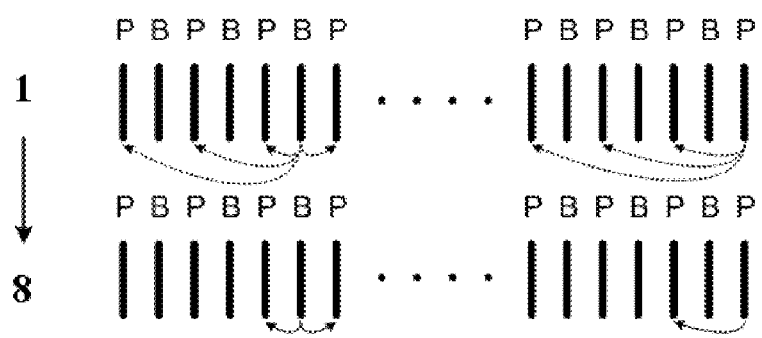

FIG. 5: schematic representation of the method to convert multiple reference frames used in the binary H.264/AVC (1) fluxes for only 2 or 1 reference frames, as is used in MPEG-2 (8).

Figure 6:
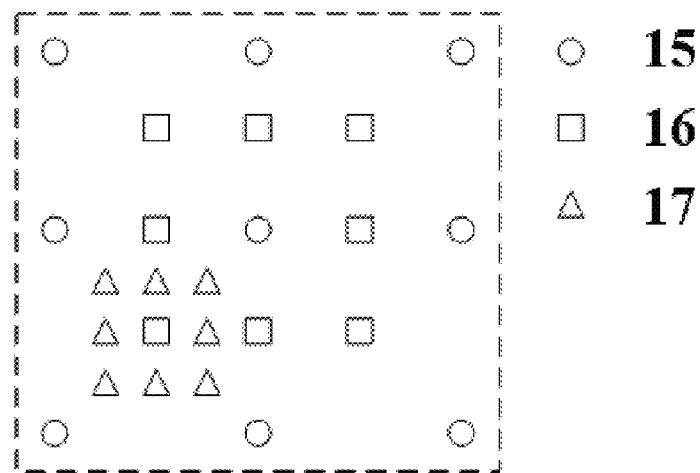

FIG. 6: schematic representation of the window used to refine the motion vectors: motion vectors with a full pixel precision (15), motion vectors with a half (½) pixel precision (16) and motion vectors with a quarter (¼) pixel precision (17).

Figure 7:
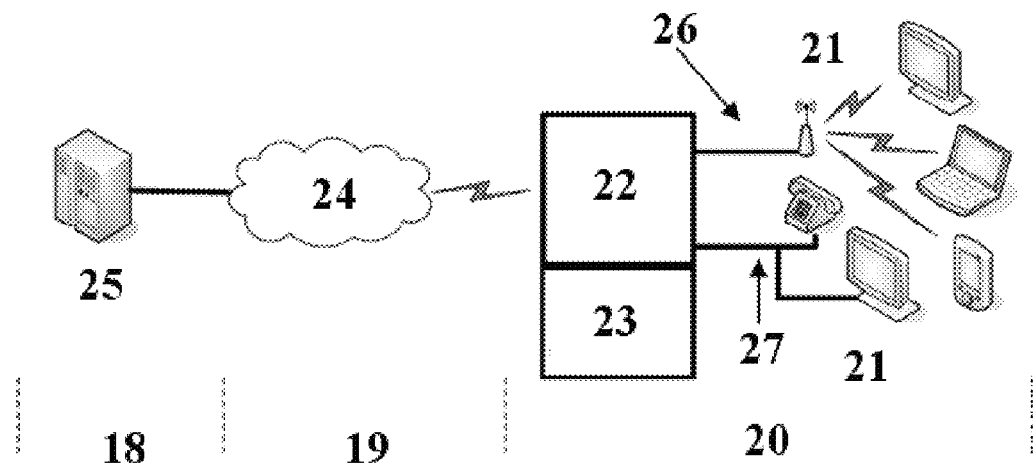

FIG. 7: schematic representation of an example of the application of the present disclosed subject matter, where (18) represents the installations of the service provider, (19) represents the connection between the service provider and the installations of the user, (20) represents the installations of the user, (21) represents the terminal equipment in the installations of the user, (22) represents a domestic server (home gateway), (23) represents the transcoder, (24) represents the video transmission in the H.264/AVC format, (25) represents the server of the service provider, (26) represents the wireless connection with the terminal equipment, (27) represents the wire connection with the terminal equipment.

DETAILED DESCRIPTION OF THE DISCLOSED SUBJECT MATTER

Generating the MV List and Selecting the Best Candidate

For each macro-block to be transcoded, an initial list of candidate MVs is created, which consists of or can include the MVs of all the sub-blocks of the H.264/AVC macro-block. Those that possess reference frames that are not compatible with the MPEG-2 format undergo the process of redimensioning described in FIG. 4. The method described in FIG. 2 is also applied to the MVs that are of the "unrestricted MV" type. In the case of the original macro-block, in the H.264/AVC format, being coded in a uni-directional prediction mode and the transcoded block, in MPEG-2 format, enable the bi-directional mode, and so the method described in FIG. 3 can also be applied. After the preceding operations, the resulting list only contains vectors for one or two reference frames, as permitted by the MPEG-2 norm. The best candidate is selected on the basis of this second list, calculating the residual signal that results from the application of each MV to the macro-block in question and choosing the one that produces the least residual signal using the SSD (Sum of Square Differences) or SAD (Sum of Absolute Differences) as a measurement criterion.

Inversion of the Motion Vectors (MV)

The proposed method claims a solution to deal with a H.264/AVC (1) restriction, a solution that consists of or can include allowing motion vectors through the edges of the frame, so as to compensate for the movement of areas close to the edges of the frame. As this characteristic is not present in MPEG-2 (8), all the motion vectors with this characteristic are immediately excluded from the conversion (4).

A method capable of recovering this kind of motion vectors, when they belong to a type B (bidirectional) frame, is claimed in the following manner: in bi-directional type frames the prediction allows the use of adjacent frames as a reference; thus, the proposed method uses this characteristic to resolve the MPEG-2 (8) restriction. The motion vector v1 (9a) of the initial scenario A (9) presented in FIG. 2 describes an invalid prediction for MPEG-2 (8). So as to re-use the prediction information in the coder (6), v2 (10a) is obtained by inverting the motion vector v1 (9a) according to equation 1 and applying it to the symmetric reference frame as in scenario B (10). As these frames can use bi-directional prediction, the motion vectors that point to beyond the edges of the frame are inverted according to equation 1, so as to use the opposite reference frame and thus point to within the edges of the frame. This enables the recovery of a significant number of motion vectors, especially in film sequences with camera panning and constant movement.

$$MVx_{MPEG\text{-}2} = -(MVx_{H.264} \times S_f)$$

$$MVy_{MPEG\text{-}2} = -(MVy_{H.264} \times S_f) \quad (1)$$

Sf is the scale factor which will be described shortly (see equation 3)

Uni-Directional to Bidirectional Conversion

The use of bi-directional predictions is a method known to produce good predictions of results. The combination of advanced frames and previous frames as a reference reduces the residual information to be coded. The proposed method claims the conversion of the uni-directional prediction to bi-directional predictions (see FIG. 3) when coding type B (bi-predictive) frames. The method is based on the same theoretical basis as the previous section, where the v1 source motion vector (9d) is inverted so as to generate the v2 motion vector (10e). The bi-directional prediction is obtained by combining v1 (10d) and v2 (10e), as illustrated in scenario B (10c), to produce a single prediction that simultaneously uses advanced and previous frames as a reference (10f).

$$MVx_{MPEG\text{-}2} = (MVx_{H.264} \times S_f) \text{ and } -(MVx_{H.264} \times S_f)$$

$$MVy_{MPEG\text{-}2} = (MVy_{H.264} \times S_f) \text{ and } -(MVy_{H.264} \times S_f) \quad (2)$$

Scale Conversion

The H.264/AVC (1) standard allows the use of multiple reference frames, which is beyond the scope of the MPEG-2 (8). The conversion (4) of the predictions of the reference frame to a format compatible with MPEG-2 (8) is necessary to maintain valid predictions. So as to carry out this conversion (4), it is necessary to change the scale of the motion vector according to the temporal distance between the current frame and the reference frame. A multiplicative factor is found, based on the new temporal distance, and the motion vector with the modified scale is determined using this factor. The scale factor is determined as follows: the computation of the scale factor for converting the motion vector assumes a constant motion from the corresponding predicted area. Thus, the scale factor is obtained by means of a linear interpolation illustrated in FIG. 4 and described in equation 3, where (11) is H.264$_{ref-fn}$, corresponding to the H264 reference frame number, (12) is MPEG-2$_{ref-fn}$, corresponding to the MPEG-2 reference frame number, and (13) is C$_{fn}$, corresponding to the current frame number.

$$S_f = (C_{fn} - MPEG2_{ref-fn})/(C_{fn} - H.264_{ref-fn}) \quad (3)$$

In MPEG-2 (8), the motion estimate is based on one or two of the last reference frames that are used to predict the current frame, while in H.264/AVC (1) up to 16 reference frames can be used for the same purpose. Thus, H.264/AVC (1) motion vectors which point towards a reference frame in a temporal position that is different from that of the current MPEG-2 (8) reference frames, change their scale according to the method illustrated in FIG. 5.

In order to change the prediction of the reference frame, it is necessary to recalculate the associated motion vector to maintain its significance. The recalculation of the H.264/AVC (VM$_{H.264}$) motion vector to MPEG-2 (VM$_{MPEG-2}$) implies a change in scale, in accordance with the temporal difference between the new reference frame and the original reference frame, as described in equation 4.

$$VM_{MPEG-2} = VM_{H.264} \times S_f \quad (4)$$

Refining

The H.264/AVC prediction can use motion vectors with a precision of one quarter (¼) of a pixel (17), while in MPEG-2 the maximum motion precision is half (½) a pixel (16), as illustrated in FIG. 6. Thus, the conversion of motion vectors also implies a conversion of precision if one quarter (¼) of a pixel (17) is used in H.264/AVC. A method to convert motion vectors with a precision of one quarter (¼) of a pixel (17) to whole (15) or a half (½) (16) pixel without realizing new searches for motion vectors or refining motion vectors is claimed. The motion vector with a precision of one quarter (¼) of a pixel (17) is rounded off bi-directionally to the position of the closest half (½) pixel (16) or whole pixel (15) in the grid of pixel frames, according to the rules described below.

As the computation of MPEG-2 motion vectors can involve both a change in scale as well as the conversion of the pixel precision, the method uses rounding off instead of truncation, so as to achieve an efficient prediction.

A method of MV refinement limited to a distance of half a pixel (16) is implemented to provide fine adjustments in the conversion process. The direct MV conversion, with a precision of a quarter (¼) pixel, from H.264/AVC (1) to MPEG-2 (8) is a method with losses, which reduces the precision of motion vectors. The method claimed here, firstly, makes each motion vector correspond to the position of the closest half pixel. Then the final motion vector is found amongst the closest half pixel or full pixel positions, in a search window with a maximum dimension of 1×1 pixel (16). The search process consists of or can include multiple calculations of the residual information for each position of the refinement search window. The best vector is the one that produces the least residual information.

The residue is an indicator of the quality of the predicting elements and is obtained by means of the Sum of Squared Differences (SSD) between the original area of the macro-block and the predicted area, as in equation 5. The best position from the search window is selected according to the lowest SSD value. In equation 5, f(i,j) represents the pixel in position (i,j) of the macro-block to be transcoded and p(i,j) represents the corresponding pixel in the reference macro-block, which also constitutes the respective prediction.

$$SSD = \Sigma_i \Sigma_j (f(i,j) - p(i,j))^2 \quad (5)$$

EXAMPLES OF APPLICATIONS

An example of the applications is illustrated in FIG. 7, where a transcoder (23) of the kind described in this document is used in a domestic server ("Home Gateway") (22), which links a public network (19) and the installations of a user (20). The digital compressed video content exists on the server of the service provider (ISP) (25), being transmitted (24) to the user in the H.264/AVC (1) format because it thus occupies less bandwidth in communications and less storage space on the terminal equipment (21). However, the final user has equipment (21) compatible with MPEG-2 (8), and thus the conversion of the format (4) is carried out in the connection with the Home Gateway (22) which links the public distribution network (19) and the user's local network. Since the hardware platform that supports the Home Gateway (22) is, generally, shared with other protocol conversion operations, signaling or access control, it is advisable that the transcoder (23) not be very complex in computational terms so as not to compromise the performance. On the other hand, this function of transcoding (23) should introduce only a minimal distortion in the converted signal.

It will be apparent to those skilled in the art that various modifications and variations can be made in the presently disclosed subject matter without departing from the spirit or scope of the presently disclosed invention. Thus, it is intended that the presently disclosed subject matter cover the modifications and variations of the invention provided they come within the scope of the appended claims and their equivalents. All related art references described above are hereby incorporated in their entirety by reference.

The invention claimed is:

1. Method to transcode H.264/AVC video frames into MPEG-2comprising:
    converting the H.264/AVC interframe coding modes into modes allowed by MPEG-2 and converting H.264/AVC motion information into corresponding MPEG-2 semantics;
    determining a most suitable motion vector for each MPEG-2 macro-block, according to the following steps:
    a) Creating a list of motion vectors on the basis of the motion vectors of the reference frames and the sub-blocks of the H.264/AVC macro-block corresponding to the MPEG-2macro-block, as long as the motion vectors are allowed in MPEG-2,
    b) Adding to the list the motion vectors that were not included in the preceding step, subjecting them to one or more adaptation methods, so that they can be permitted in MPEG-2,
    c) Selecting from the list the motion vector that produces the least residual signal, which results from the application of each motion vector to the macro-block, irrespective of size of the macro-block,
and further comprising adapting the H.264/AVC motion vectors that are not compatible with MPEG-2 by means of at least one of the following operations:
    a) Redimensioning motion vectors that use different reference frames from the reference frames permitted by MPEG-2, so as to use reference frames that are permitted by MPEG-2, by altering the scale of the motion vector by linear interpolation based on a new temporal distance,
    b) Converting the motion vectors that exceed edges of the frame, called unrestricted motion vectors, into vectors that are compatible with MPEG-2 by inversion and temporal mirroring, which consists of inversion with regard to both the horizontal and vertical axes, along with exchanging the reference frame with a temporally opposite frame, in terms of the frame being coded, c) Creating bi-directional references on the basis of uni-directional references, using motion vectors with uni-directional prediction in bi-directional frames, combining said motion vector with another motion vector obtained by inversion and the temporal mirroring of the first motion vector.

2. The method to transcode H.264/AVC video frames into MPEG-2 according to claim 1 further comprising calculating the residual signal which results from the application of each motion vector to a macro-block by the Sum of Square Differences (SSD)–SSD=$\Sigma_i \Sigma_j (f(i,j)-p(i,j))^2$.

3. The method to transcode H.264/AVC video frames into MPEG-2 according to claim 1 further comprising calculating the residual signal which results from the application of each motion vector to a macro-block by one of the Sum of Square Differences (SSD)–SSD=$\Sigma_i \Sigma_j (f(i,j)-p(i,j))^2$ and the Sum of Absolute Differences (SAD)–SAD=$\Sigma_i \Sigma_j | f(i,j)-p(i,j) |$.

4. The method to transcode H.264/AVC video frames into MPEG-2 according to claim 1 further comprising calculating the residual signal that results from the application of each motion vector to a macro-block using the Sum of Absolute Differences (SAD)–SAD=$\Sigma_i \Sigma_j | f(i,j)-p(i,j) |$.

5. The method to transcode H.264/AVC video frames into MPEG-2 in accordance with claim 2, further comprising:
  refining the position of the selected motion vector with the precision of half a pixel, by a bi-directional rounding off to the closest half (½) or full pixel position.

6. The method to transcode H.264/AVC video frames into MPEG-2 in accordance with claim 4, further comprising:
  refining the position of the selected motion vector with the precision of half a pixel, by a bi-directional rounding off to the closest half (½) or full pixel position.

7. The method to transcode H.264/AVC video frames into MPEG-2 in accordance with claim 1, further comprising:
  refining the position of the selected motion vector with the precision of half a pixel, by a bi-directional rounding off to the closest half (½) or full pixel position.

8. The method to transcode H.264/AVC video frames into MPEG-2 in accordance with claim 7 wherein refining the position of the selected motion vector with the precision of half a pixel, by a bi-directional rounding off to the closest half (½) or full pixel position, is accomplished by means of a method that comprises the following steps:

a) Making each motion vector correspond to a position of the closest half pixel,
  b) Searching for the motion vector amongst closest pixel or half pixel positions, in a search window with a half pixel dimension,
  c) Calculating, for each position of the search window, residual information between the original area of the macro-block and a predicted area,
  d) Choosing a best position from the search window, which corresponds to the least residual information.

9. The method to transcode H.264/AVC video frames into MPEG-2 in accordance with claim 8 further comprising calculating the residual information, which results from the application of each position of the motion vector in the search window, by the Sum of Square Differences (SSD)–SSD=$\Sigma_i \Sigma_j (f(i,j)-p(i,j))^2$.

10. The method to transcode H.264/AVC video frames into MPEG-2 in accordance with claim 8 further comprising calculating the residual information, which results from the application of each position of the motion vector in the search window, by the Sum of Absolute Differences (SAD)–SAD=$\Sigma_i \Sigma_j | f(i,j)-p(i,j) |$.

11. A device to implement the method to transcode H.264/AVC video frames into MPEG-2 of claim 4 comprising:
  a) a decoder which is compatible with the H.264/AVC norm, modified so as to export coding parameters included in input H.264/AVC fluxes,
  b) a data converting module which implements the conversion methods,
  c) a coder compatible with the MPEG-2 norm, modified so as to be able to use output coding parameters supplied by the data conversion module, or coding parameters obtained directly from the H.264/AVC decoder, while also being able to optimise values so as to maximise the coding efficiency.

12. A device to implement the method to transcode H.264/AVC video frames into MPEG-2 of claim 1 comprising:
  a) a decoder which is compatible with the H.264/AVC norm, modified so as to export coding parameters included in input H.264/AVC fluxes,
  b) a data converting module which implements the conversion methods,
  c) a coder compatible with the MPEG-2 norm, modified so as to be able to use output coding parameters supplied by the data conversion module, or coding parameters obtained directly from the H.264/AVC decoder, while also being able to optimise values so as to maximise the coding efficiency.

13. A device to implement the method to transcode H.264/AVC video frames into MPEG-2 of claim 2 comprising:
  a) a decoder which is compatible with the H.264/AVC norm, modified so as to export coding parameters included in input H.264/AVC fluxes,
  b) a data converting module which implements the conversion methods,
  c) a coder compatible with the MPEG-2 norm, modified so as to be able to use output coding parameters supplied by the data conversion module, or coding parameters obtained directly from the H.264/AVC decoder, while also being able to optimise values so as to maximise the coding efficiency.

14. A device to execute the method to transcode H.264/AVC video frames into MPEG-2 in accordance with claim 12 also including:
  a) a connection to a service provider through the H.264/AVC format,
  b) an optional connection to a domestic server,
  c) an optional wireless connection with terminal equipment,
  d) an optional wired connection with terminal equipment.

* * * * *